United States Patent
Kurono et al.

(10) Patent No.: US 9,797,483 B2
(45) Date of Patent: Oct. 24, 2017

(54) GUIDE SHOE

(71) Applicant: TSUBAKIMOTO CHAIN CO., Osaka-shi, Osaka (JP)

(72) Inventors: Yuta Kurono, Osaka (JP); Toshihiko Miyazawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/935,741

(22) Filed: Nov. 9, 2015

(65) Prior Publication Data
US 2016/0138684 A1 May 19, 2016

(30) Foreign Application Priority Data

Nov. 14, 2014 (JP) .................. 2014-231792

(51) Int. Cl.
*F16H 7/18* (2006.01)
*F16H 7/08* (2006.01)

(52) U.S. Cl.
CPC ....... *F16H 7/18* (2013.01); *F16H 2007/0872* (2013.01); *F16H 2007/0893* (2013.01); *F16H 2007/185* (2013.01)

(58) Field of Classification Search
CPC .............................. F16H 2007/185; F16H 7/18
USPC ................................................. 474/111, 140
See application file for complete search history.

(56) References Cited

U.S. PATENT DOCUMENTS

| 5,000,724 | A | * | 3/1991 | Reid | .......... | F16H 7/08 |
| | | | | | | 474/111 |
| 5,176,582 | A | * | 1/1993 | Chang | .................. | E05F 15/684 |
| | | | | | | 49/360 |
| 5,441,458 | A | * | 8/1995 | Rogus | .................. | F16H 7/1245 |
| | | | | | | 198/826 |
| 5,961,411 | A | * | 10/1999 | Tsutsumi | .................. | F16H 7/18 |
| | | | | | | 474/111 |
| 2013/0210566 | A1 | * | 8/2013 | Konno | ....................... | F16H 7/18 |
| | | | | | | 474/111 |
| 2013/0225342 | A1 | * | 8/2013 | Yokoyama | ................ | F16H 7/18 |
| | | | | | | 474/140 |

(Continued)

FOREIGN PATENT DOCUMENTS

| JP | 10-184828 A | 7/1998 |
| JP | 5100710 B2 | 12/2012 |

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

An object is to provide a guide shoe having a simple structure and suppressing a significant shift in pitch line while reducing friction losses and preventing possible noise. In a guide shoe having a shoe surface on which a traveling chain is guided, the shoe surface includes a plate guide surface which is formed on an upstream side of the shoe surface in a shoe longitudinal direction and on which only chain plates are slidably guided, a guiding protruding portion which is formed on a downstream side of the plate guide surface and on which only a chain roller or a chain bush is guided, and a continuously transitioning protruding portion that smoothly connects the plate guide surface and the guiding protruding surface together. Plate escaping portions are formed on opposite sides across the guiding protruding portion in a shoe width direction to avoid contact with the chain plates.

8 Claims, 4 Drawing Sheets

(56) References Cited

U.S. PATENT DOCUMENTS

2014/0187371 A1\* 7/2014 Lee .................... F16H 7/18
474/140
2016/0138684 A1\* 5/2016 Kurono ............... F16H 7/18
474/140

\* cited by examiner

GUIDE SHOE

BACKGROUND OF THE INVENTION

1. Field of the Invention

The present invention relates to a guide shoe with a shoe surface on which a traveling chain is guided.

2. Description of the Related Art

A chain guide is conventionally known which is assembled in a timing system in an engine room in an automobile to guide a chain traveling between sprockets to properly maintain chain tension. Such a chain guide includes a guide shoe with a shoe surface and a base member that supports the guide shoe along a guide longitudinal direction.

Various shoe surface aspects of such a guide shoe are well known. For example, in the known aspects, a chain plate end surface is slidably guided along a shoe surface shaped like a flat surface or a chain roller is rolled and guided by a guiding protruding portion formed on the shoe surface.

However, in the former guide shoe, the sliding of the chain plate end surface on the shoe surface disadvantageously causes an increase in chain traveling resistance, promoting sliding friction of the guide shoe. In the latter guide shoe, the chain roller intermittently collides against an upstream end of the guiding protruding portion, and the collision disadvantageously causes noise and increases friction losses.

Thus, in order to solve the above-described problem, the present applicant has proposed a guide shoe in which a shoe surface includes a plate guide surface which is formed on an upstream side of the shoe surface in the shoe longitudinal direction and on which only the chain plate is slidably guided, a guiding protruding portion which is formed on a downstream side of the plate guide surface and on which only the chain roller is guided, and a continuously transitioning protruding portion that smoothly connects the plate guide surface and the guiding protruding portion together such that slidable guiding of the chain plate on the chain plate can be smoothly shifted, by the continuously transitioning protruding portion, to rolling guidance of the chain roller by the guiding protruding portion, with a possible excessive collision between the chain roller and the guiding protruding portion avoided (see Japanese Patent Application Laid-open No. H10-184828).

In the guide shoe described in Japanese Patent Application Laid-open No. H10-184828, the height dimension of the guiding protruding portion from the shoe surface is designed to enable avoidance of contact of the chain plate end surface with the shoe surface when the chain roller is guided by the guiding protruding portion. However, in view of possible wear of the guiding protruding portion, possible dimensional errors in chain components, and the like, the height dimension of the guiding protruding portion needs to be equal to or larger than a design value. As a result, a pitch line of the chain traveling on the guide shoe is disadvantageously significantly shifted upward at the guiding protruding portion.

Thus, the present invention is intended to solve such a problem. An object of the present invention is to provide a guide shoe having a simple structure and suppressing a significant shift in pitch line while reducing friction losses and preventing possible noise.

SUMMARY OF THE INVENTION

In order to accomplish the object, the present invention provides a guide shoe having a shoe surface on which a traveling chain is guided, wherein the shoe surface includes a plate guide surface which is formed on an upstream side of the shoe surface in a shoe longitudinal direction and on which only chain plates are slidably guided, a guiding protruding portion which is formed on a downstream side of the plate guide surface and on which only a chain roller or a chain bush is guided, and a continuously transitioning protruding portion that smoothly connects the plate guide surface and the guiding protruding surface together, and plate escaping portions are formed on opposite sides across the guiding protruding portion in a shoe width direction to avoid contact with the chain plates.

In an aspect of the present invention, the shoe surface includes the plate guide surface which is formed on the upstream side of the shoe surface in the shoe longitudinal direction and on which only the chain plate is slidably guided, the guiding protruding portion which is formed on the downstream side of the plate guide surface and on which only the chain roller or a chain bush is guided, and the continuously transitioning protruding portion that smoothly connects the plate guide surface and the guiding protruding surface together, and the plate escaping portions are formed on the opposite sides across the guiding protruding portion in the shoe width direction to avoid contact with the chain plate. Thus, even when the height dimension of the guiding protruding portion is designed to be small, the contact of the chain plate end surface with the shoe surface can be reliably avoided during guidance by the guiding protruding portion. Consequently, the simple structure is used to allow a significant shift in pitch line to be suppressed while reducing friction losses and preventing possible noise.

In another aspect of the present invention, an upstream end of the plate escaping portion is formed downstream of an upstream end of the guiding protruding portion at a distance from the upstream end, with the distance being equal to or more than double of a chain pitch. Thus, in an area from the upstream end of the guiding protruding portion to an upstream end of the plate escaping portion, at least two chain rollers or chain bushes can be kept lying on the guiding protruding portion. Therefore, stable chain traveling can be achieved.

In another aspect of the present invention, at least an upstream end of the continuously transitioning protruding portion is formed like a taper so as to increase in width from an upstream side toward a downstream side. Thus, even if the traveling chain is slightly deflected in the shoe width direction, the chain roller can be smoothly guided onto the continuously transitioning protruding portion.

In another aspect of the present invention, outer plate guide wall portions are each formed on an outer side of the corresponding plate escaping portion in the shoe width direction to face an outer side surface of an outer plate of the chain plates to guide the chain. Thus, not only is a guide function performed by the guiding protruding portion positioned between inner side surfaces of an inner plate but also the chain can be guided from the outer side surface side of the outer plate. Consequently, the traveling chain can be reliably prevented from being tilted in the shoe width direction, further reducing friction losses.

In another aspect of the present invention, a groove-like outer plate contact avoiding portion is formed in the plate guide surface to avoid contact with only the outer plate of the chain plates. This enables not only a reduction in the number of chain plates contacting the plate guide surface, allowing friction losses to be reduced, but also a reduction in the mass of the guide shoe.

In another aspect of the present invention, a groove-like inner plate contact avoiding portion is formed in the plate guide surface to avoid contact with only the inner plate of the chain plates. This enables not only a reduction in the number of chain plates contacting the plate guide surface, allowing friction losses to be reduced, but also a reduction in the mass of the guide shoe.

DESCRIPTION OF THE PREFERRED EMBODIMENTS

A guide shoe 100 according to a first embodiment of the present invention will be described below based on FIGS. 1 to 5.

Figure 1:
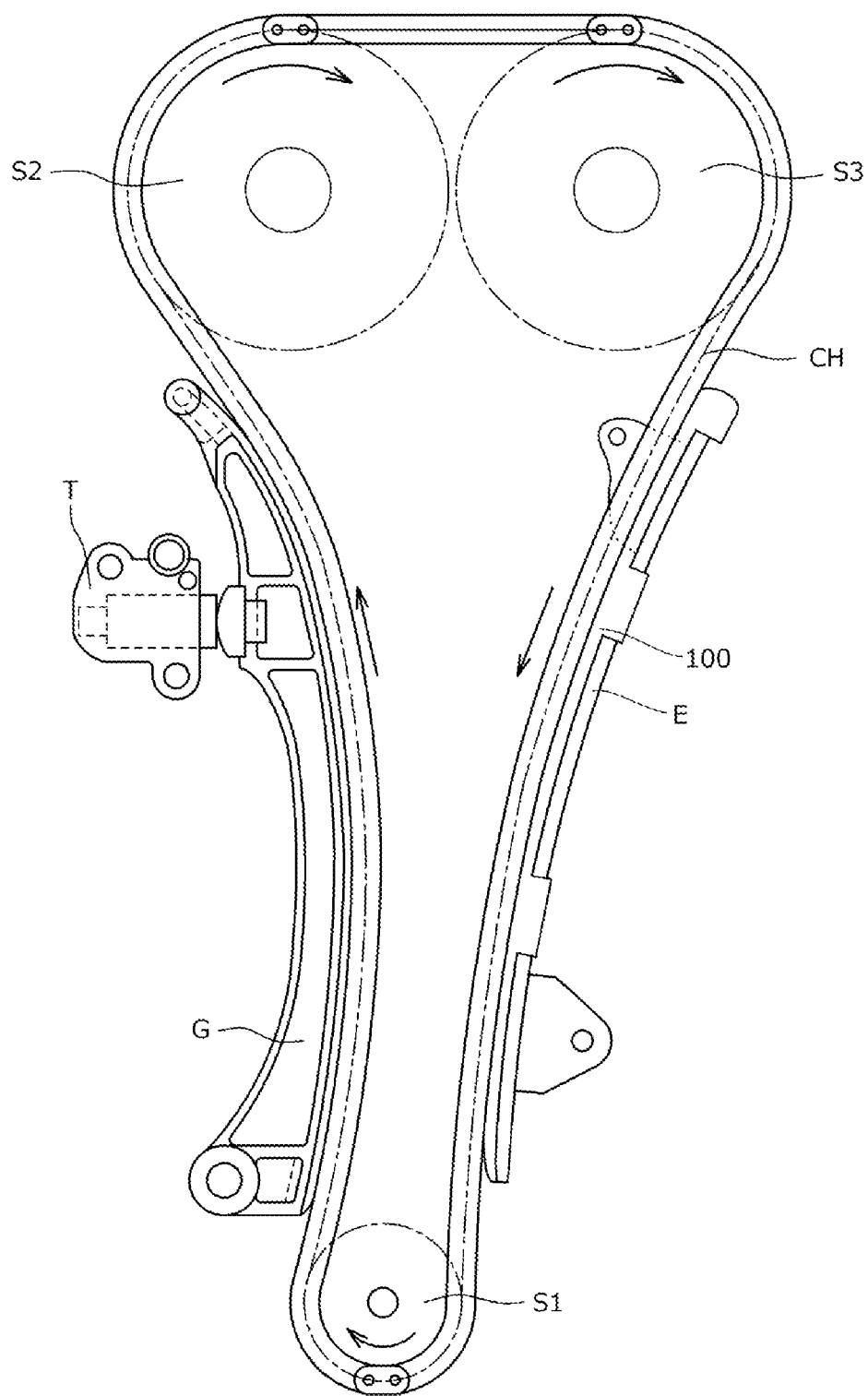
FIG. 1 is a diagram of a use aspect of a guide shoe according to a first embodiment of the present invention.

As depicted in FIG. 1, the guide shoe 100, supported by a metallic base member E fixed to an engine block (not depicted in the drawings) with the guide shoe 100 attached thereto, is assembled in a timing system installed in an engine room. The guide shoe 100 guides a chain CH configured as a roller chain traveling among sprockets S1 to S3 to properly maintain chain tension. Specifically, as depicted in FIG. 1, the guide shoe 100 guides the chain CH wound around the sprockets S1 to S3 provided over a crank shaft and a cam shaft to stabilize the traveling of the chain CH, while properly maintaining the tension of the chain CH. In the present embodiment, the guide shoe 100 is configured as a guide shoe for a fixed guide fixedly installed in the engine room. However, the guide shoe 100 may be configured as a guide shoe for a pivoting guide G that is pivotally supported by a shaft in the engine room and pressed toward the chain CH by a tensioner T as depicted in FIG. 1.

The guide shoe 100 is formed of a synthetic resin material and has a shoe surface 110 that faces the engine room and that extends in a chain traveling direction. Guide wall portions 160 are formed on outer sides of the shoe surface 110 in a shoe width direction. A side wall portion 170 is formed outside one of the guide wall portions 160. The above-described guide wall portions 160 and side wall portion 170 may be omitted from a partial area or the entire area in a shoe longitudinal direction as needed.

Figure 2:
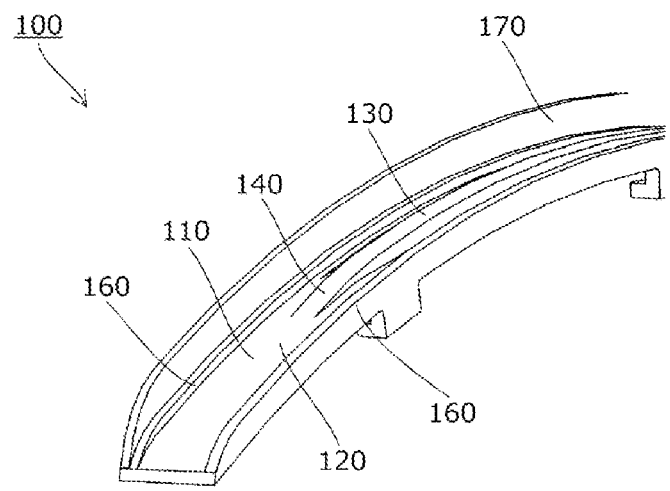
FIG. 2 is a perspective view depicting the guide shoe according to the first embodiment.
Figure 3:
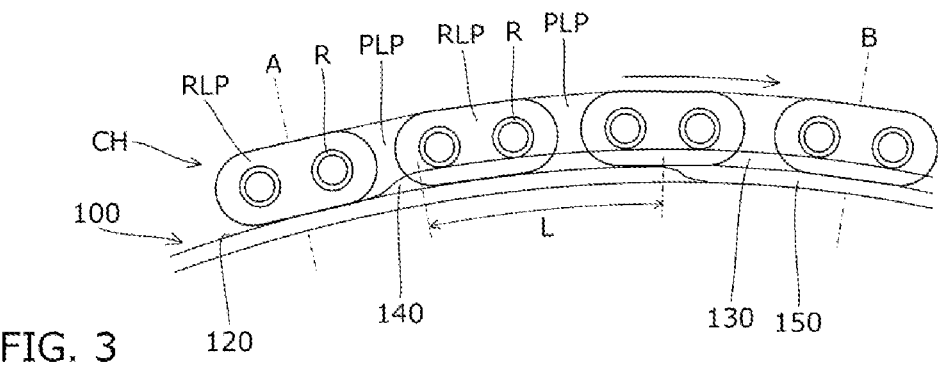
FIG. 3 is a diagram illustrating the guide shoe of the first embodiment as viewed in a lateral direction.
Figure 4:
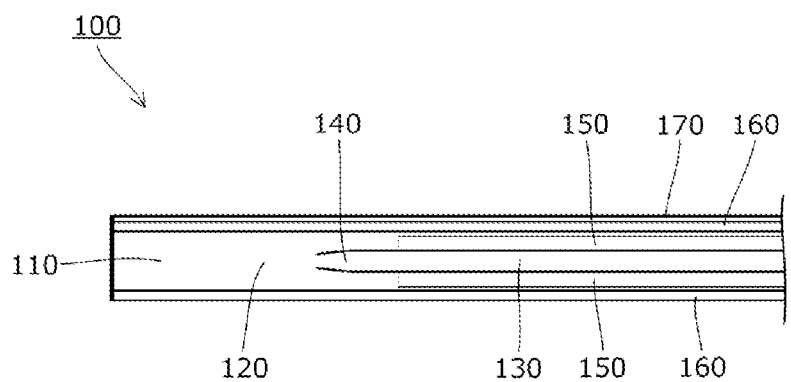
FIG. 4 is a top view depicting the guide shoe of the first embodiment.

As depicted in FIGS. 2 to 4, the shoe surface 110 of the guide shoe 100 includes a plate guide surface 120 formed on an upstream side (chain entry side) of the shoe surface 110 in the shoe longitudinal direction and on which only chain plates PLP and RLP of the chain CH are slidably guided, a guiding protruding portion 130 formed on a downstream side of the plate guide surface 120 and on which only a chain roller R is guided, and a continuously transitioning protruding portion 140 that connects the plate guide surface 120 and the guiding protruding portion 130 together. Plate relief portions 150 are formed on opposite sides across the guiding protruding portion 130 in a shoe width direction to avoid contact with the chain plates PLP and RLP.

As depicted in FIGS. 2 to 4, the plate guide surface 120 is flat.

Figure 5:
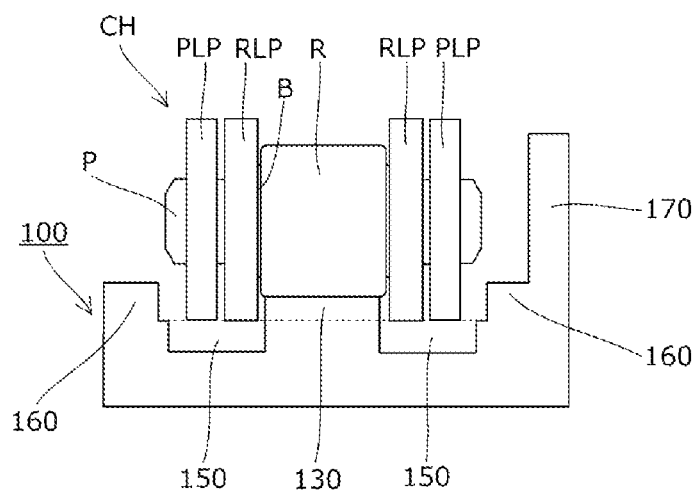
FIG. 5 is a diagram depicting the guide shoe of the first embodiment as viewed at a position B in FIG. 3.

As depicted in FIGS. 2, 4, and 5, the guiding protruding portion 130 is formed in the center of the shoe surface 110 in the shoe width direction and extends along the shoe longitudinal direction.

As depicted in FIGS. 2 to 4, the continuously transitioning protruding portion 140 is inclined so as to smoothly connect the plate guide surface 120 and the guiding protruding portion 130 together. As depicted in FIG. 4, at least an upstream end of the continuously transitioning protruding portion 140 is formed like a taper so as to increase in width from the upstream side toward the downstream side.

As depicted in FIGS. 3 to 5, the plate escaping portions 150 are formed like recess grooves on opposite sides across the guiding protruding portion 130 in the shoe width direction by recessing the shoe surface 110, and extend along the shoe longitudinal direction. An upstream end of each of the plate escaping portions 150 is formed downstream of an upstream end of the guiding protruding portion 130 at a distance from the upstream end that is equal to or more than double of a chain pitch. That is, as depicted in FIG. 3, a distance L from the upstream end of the guiding protruding portion 130 to the upstream end of the plate escaping portions 150 is set equal to or more than the double of the chain pitch.

Next, a guide shoe 200 according to a second embodiment will be described based on FIG. 6. The second embodiment is exactly the same as the above-described first embodiment except for a part of the configuration. Thus, reference numbers in the 100s in the specification and drawings that relate to the second embodiment are replaced with reference numerals in the 200s, and description of the components other than those which are different from the corresponding components of the first embodiment is omitted.

First, in the above-described first embodiment, when the chain CH travels on the guiding protruding portion 130, the guiding protruding portion 130 positioned between inner side surfaces of laterally opposite inner plates RLP functions to guide the chain CH in the shoe width direction as depicted in FIG. 5.

Figure 6:
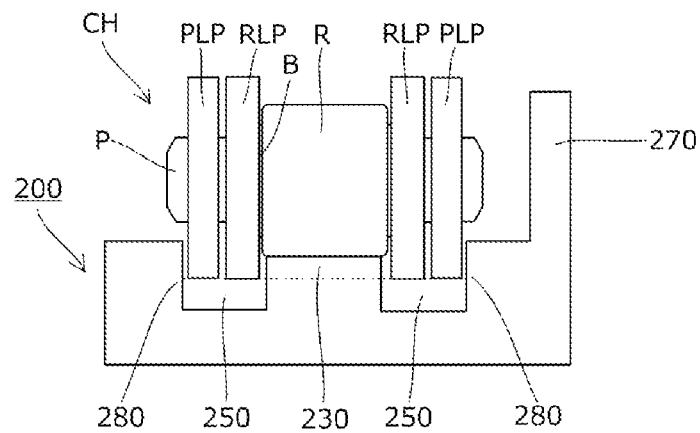
FIG. 6 is a diagram depicting a guide shoe of a second embodiment as viewed at the position B in FIG. 3.

In contrast, in the second embodiment, outer plate guide wall portions 280 are each formed outside the corresponding plate escaping portion 250 and lies opposite to an outer side surface of an outer plate PLP of the chain plates to guide the chain as depicted in FIG. 6. Consequently, not only is the guide function performed by the guiding protruding portion 230 but the outer plate guide wall portions 280 allows the chain CH to be guided in the shoe width direction.

Now, a guide shoe 300 according to a third embodiment will be described based on FIG. 7. The third embodiment is exactly the same as the above-described first embodiment except for a part of the configuration. Thus, reference numbers in the 100s in the specification and drawings that relate to the third embodiment are replaced with reference numerals in the 300s, and description of the components other than those which are different from the corresponding components of the first embodiment is omitted.

Figure 7:
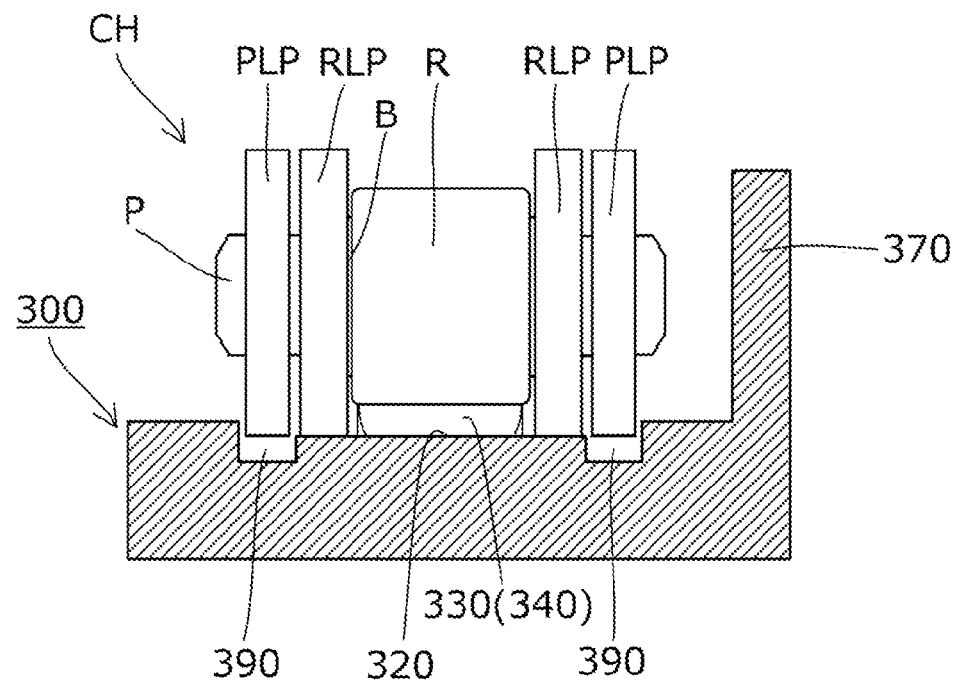
FIG. 7 is a diagram depicting a guide shoe of a third embodiment as viewed at a position A in FIG. 3.

In the guide shoe 300 of the third embodiment, outer plate contact avoiding portions 390 are each formed like a recess groove in a plate guide surface 320 so as to avoid contact with only the outer plate PLP as depicted in FIG. 7. In the example depicted in FIG. 7, the outer plate contact avoiding portion 390 is formed like a recess groove, but the specific aspect of the outer plate contact avoiding portion 390 is not limited to this. For example, the outer plate contact avoiding portion 390 may be formed like a through groove penetrating the guide shoe from a front surface (shoe surface) to a back surface thereof.

The outer plate contact avoiding portion 390 is formed to extend from the middle of the plate guide surface 320 in the shoe longitudinal direction. Thus, the plate guide surface 320 is contacted first by both the inner plates RLP and the outer plates PLP of the chain CH, but then the plate guide surface 320 is contacted only by the inner plates RLP. Subsequently, a continuously transitioning protruding portion 340 and a guiding protruding portion 330 are contacted by only the chain roller R. The formation position of the outer plate contact avoiding portion 390 in the plate guide surface 320 in the shoe longitudinal direction is not limited to the above-described position.

Next, a guide shoe 400 according to a fourth embodiment will be described based on FIG. 8. The fourth embodiment is exactly the same as the above-described first embodiment except for a part of the configuration. Thus, reference numbers in the 100s in the specification and drawings that relate to the fourth embodiment are replaced with reference numerals in the 400s, and description of the components other than those which are different from the corresponding components of the first embodiment is omitted.

Figure 8:
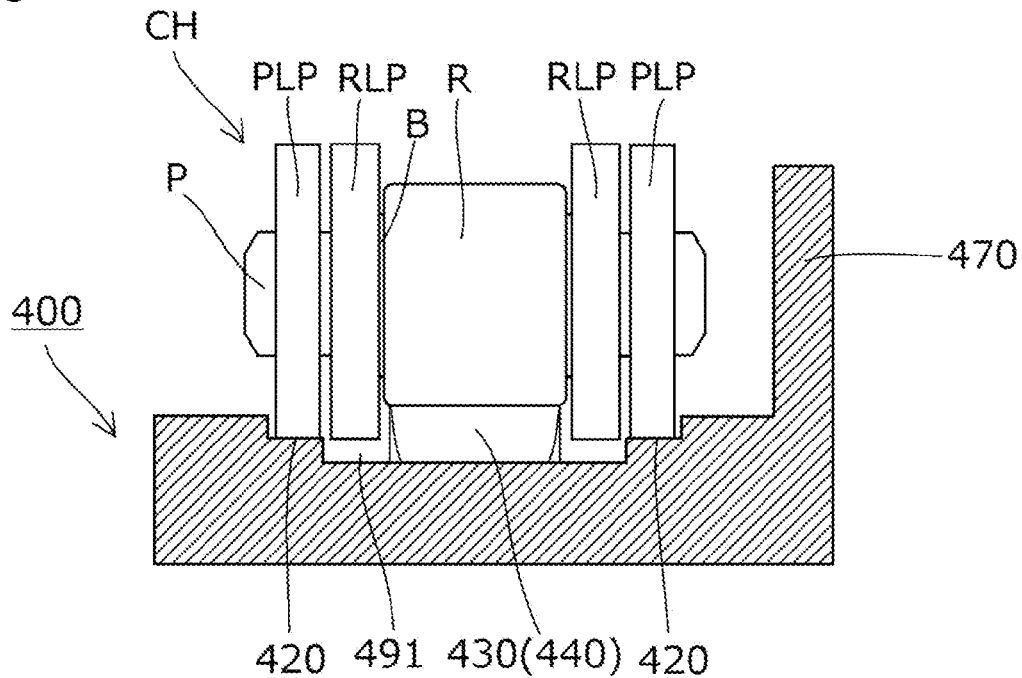
FIG. 8 is a diagram depicting a guide shoe of a fourth embodiment as viewed at the position A in FIG. 3.

In the guide shoe 400 of the fourth embodiment, an inner plate contact avoiding portion 491 is recessed in a plate guide surface 420 so as to avoid contact with only the inner plates RLP as depicted in FIG. 8. In the example depicted in FIG. 8, the inner plate contact avoiding portion 491 is formed like a recess groove, but the specific aspect of the inner plate contact avoiding portion 491 is not limited to this. For example, the inner plate contact avoiding portion 491 may be formed like a through groove penetrating the guide shoe from a front surface (shoe surface) to a back surface thereof.

The inner plate contact avoiding portion 491 is formed to extend from the middle of the plate guide surface 420 in the shoe longitudinal direction. Thus, the plate guide surface 420 is contacted first by both the inner plates RLP and the outer plates PLP of the chain CH and then by only the outer plates PLP.

Subsequently, a continuously transitioning protruding portion 440 and a guiding protruding portion 430 are contacted by only the chain roller R. The formation position of the inner plate contact avoiding portion 491 in the plate guide surface 420 in the shoe longitudinal direction is not limited to the above-described position.

The embodiments of the present invention have been described in detail. However, the present invention is not limited to the above-described embodiments, and various changes may be made to the design without departing from the present invention recited in the claims.

For example, in the above description of the embodiments, the chain traveling on the guide shoe is the roller chain. However, the guide shoe of the present invention may be used to guide a bush chain corresponding to the roller chain from which the chain roller is omitted. In this case, instead of the chain roller, a chain bush climbs on the guiding protruding portion.

In the above description of the embodiments, the plate escaping portions on the opposite sides across the guiding protruding portion are formed like recess grooves by recessing the shoe surface. However, the plate escaping portions have any specific aspect as long as the plate escaping portions enable avoidance of the contact between the guide shoe and the chain plates when the chain travels on the guiding protruding portion. For example, the plate escaping portion may be formed like a through groove that penetrates the guide shoe from the front surface (shoe surface) to the back surface thereof. Alternatively, the material portion of the guide shoe may be removed from the opposite sides across the guiding protruding portion, that is, a shoe longitudinal direction interval including only the guiding protruding portion may be provided.

In the above description of the embodiments, the upstream end of the plate escaping portion is formed downstream of the upstream end of the guiding protruding portion at a distance from the upstream end that is equal to or more than double of the chain pitch. However, the formation position of the plate escaping portions is not limited to this. Any formation position may be used as long as the plate escaping portion is formed laterally to the guiding protruding portion.

A well-known appropriate material may be selected for the guide shoe according to conditions such as frictional resistance, rigidity, durability, moldability, and costs. In particular, a synthetic resin material is preferable.

A well-known appropriate metallic material may be selected for a base material according to conditions such as rigidity, durability, moldability, and costs.

The guide shoe and the base member may be integrated together. The guide shoe may be configured by optionally combining configurations of the above-described plurality of embodiments.

EXPLANATION OF REFERENCE NUMERALS

100, 200, 300, 400 . . . Guide shoe
110 . . . Shoe surface
120, 320, 420 . . . Plate guide surface
130, 230 . . . Guiding protruding portion
140 Continuously transitioning protruding portion
150, 250 Plate escaping portion
160 Guide wall portion
170, 270, 370, 470 Side wall portion
280 Outer plate guide wall portion
390 Outer plate contact avoiding portion
491 Inner plate contact avoiding portion
B Base member
CH Chain
PLP Outer plate (chain plate)
RLP Inner plate (chain plate)
R Chain roller
B Chain bush
P Coupling pin
E Base member
T Tensioner
G Pivoting guide
S1 to S3 Sprocket

What is claimed is:

1. A guide shoe having a shoe surface on which a traveling chain is guided, wherein
the shoe surface includes a plate guide surface which is formed on an upstream side of the shoe surface in a shoe longitudinal direction and on which only chain plates are slidably guided, a guiding protruding portion which is formed on a downstream side of the plate guide surface and on which only a chain roller or a chain bush is guided, and a continuously transitioning protruding portion that smoothly connects the plate guide surface and the guiding protruding surface together, plate escaping portions are formed on opposite sides across the guiding protruding portion in a shoe width direction to avoid contact with the chain plates, and wherein a groove-like outer plate contact avoiding portion is formed in the plate guide surface to avoid contact with only the outer plate of the chain plates.

2. The guide shoe according to claim 1, wherein an upstream end of the plate escaping portion is formed downstream of an upstream end of the guiding protruding portion at a distance from the upstream end, with the distance being equal to or more than double of a chain pitch.

3. The guide shoe according to claim 1, wherein at least an upstream end of the continuously transitioning protruding portion is formed like a taper so as to increase in width from an upstream side toward a downstream side.

4. The guide shoe according to claim 1, wherein outer plate guide wall portions are each formed on an outer side of the corresponding plate escaping portion in the shoe width direction to face an outer side surface of an outer plate of the chain plates to guide the chain.

5. A guide shoe having a shoe surface on which a traveling chain is guided, wherein the shoe surface includes a plate guide surface which is formed on an upstream side of the shoe surface in a shoe longitudinal direction and on which only chain plates are slidably guided, a guiding protruding portion which is formed on a downstream side of the plate guide surface and on which only a chain roller or a chain bush is guided, and a continuously transitioning protruding portion that smoothly connects the plate guide surface and the guiding protruding surface together, plate escaping portions are formed on opposite sides across the guiding protruding portion in a shoe width direction to avoid contact with the chain plates, and wherein a groove-like inner plate contact avoiding portion is formed in the plate guide surface to avoid contact with only an inner plate of the chain plates.

6. The guide shoe according to claim 5, wherein an upstream end of the plate escaping portion is formed downstream of an upstream end of the guiding protruding portion at a distance from the upstream end, with the distance being equal to or more than double of a chain pitch.

7. The guide shoe according to claim 5, wherein at least an upstream end of the continuously transitioning protruding portion is formed like a taper so as to increase in width from an upstream side toward a downstream side.

8. The guide shoe according to claim 5, wherein outer plate guide wall portions are each formed on an outer side of the corresponding plate escaping portion in the shoe width direction to face an outer side surface of an outer plate of the chain plates to guide the chain.

* * * * *